United States Patent [19]

Kassai

[11] 4,261,588
[45] Apr. 14, 1981

[54] VEHICLE FOR CHILDREN

[75] Inventor: Kenzou Kassai, Osaka, Japan

[73] Assignee: Kassai Kabushiki Kaisha, Osaka, Japan

[21] Appl. No.: 46,831

[22] Filed: Jun. 8, 1979

[30] Foreign Application Priority Data

Mar. 2, 1979 [JP] Japan .................. 54/27335[U]
Apr. 24, 1979 [JP] Japan .................. 54/55563[U]

[51] Int. Cl.³ .................. B62B 7/04; B62M 1/00
[52] U.S. Cl. .................. 280/7.17; 280/87.02 R; 280/272; 280/755
[58] Field of Search .............. 280/7.17, 7.1, 87.02 W, 280/87.01, 87.02 R, 87.05, 89, 272, 755; 297/5, 6; 272/70.3

[56] References Cited

U.S. PATENT DOCUMENTS

| | | | |
|---|---|---|---|
| 1,279,540 | 9/1918 | Hams | 280/87.05 |
| 1,561,264 | 11/1925 | Mayer | 280/87.02 W |
| 1,570,410 | 1/1926 | Strauss | 280/7.1 |
| 1,638,426 | 8/1927 | Wilson | 280/87.02 W |
| 2,118,245 | 5/1938 | Jones | 280/7.17 |
| 2,415,146 | 2/1947 | Nanna | 280/7.1 |
| 2,907,372 | 10/1959 | Leger | 280/7.1 |
| 3,542,391 | 11/1970 | O'Hara | 280/87.02 R |

Primary Examiner—John J. Love
Assistant Examiner—Milton L. Smith
Attorney, Agent, or Firm—W. G. Fasse; D. F. Gould

[57] ABSTRACT

A toy vehicle for children is constructed so that a child sits on the vehicle with one leg on each side and drives it with leg strokes kicking the ground. The vehicle is provided with front and rear ground-engaging wheels, the front wheels being steerable. The steerable front wheels are selectively fixable against rotation. In addition to such selective fixing arrangement, a manual push handle is removably attached to a relatively rearward portion of the vehicle body.

9 Claims, 16 Drawing Figures

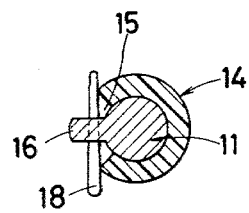
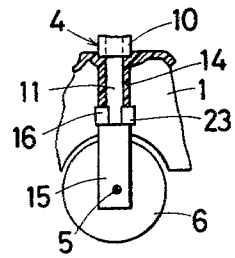
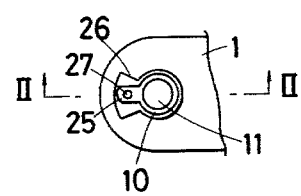
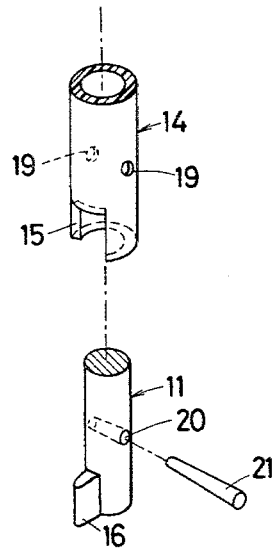
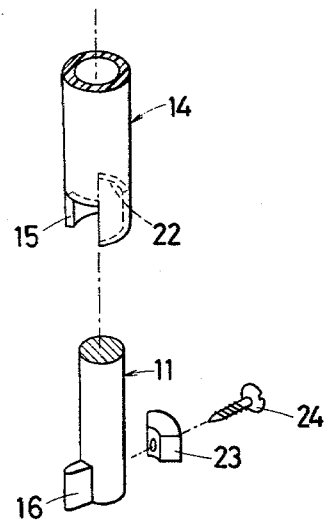
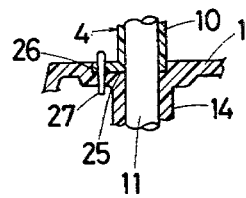
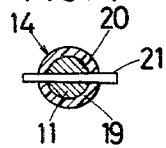
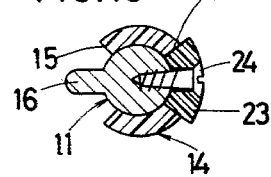

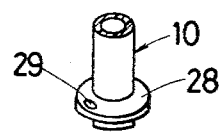
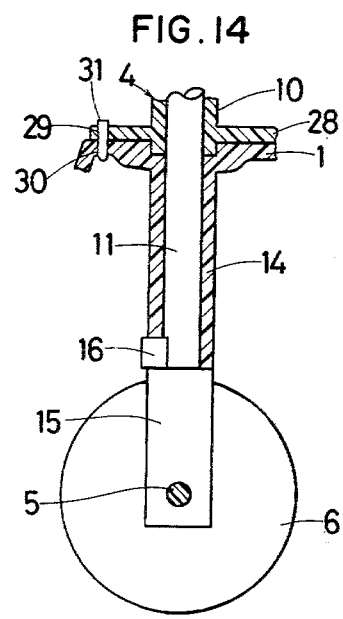
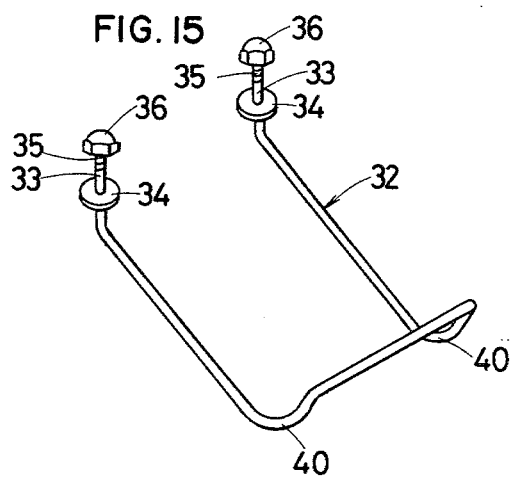
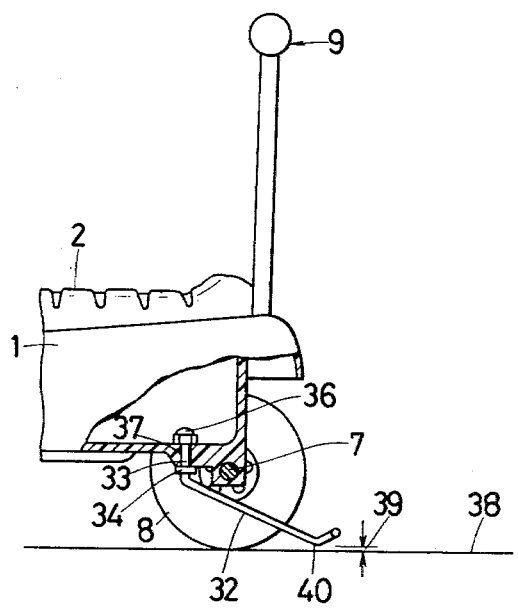

VEHICLE FOR CHILDREN

BACKGROUND OF THE INVENTION

1. Field of the Invention

The present invention relates to a toy vehicle for children, and particularly to a vehicle for children improved to allow a variety of manners of use of the vehicle.

2. Description of the Prior Art

Among vehicles for children having two front wheels and two rear wheels, there are those which have their front wheels adapted to be steered by the manipulation of the steering handles. Such vehicles for children having steerable front wheels are advantageous to train the motor nerve. However, for a very young child the steerable arrangement of front wheels is undesirable from the standpoint of safety. Therefore, it is desired to provide an unsteerable arrangement when a child is very young and a steerable arrangement at the proper time in the course of growth of the child. To this end, it is desirable that a single vehicle for children can be modified selectively to provide any one of said two arrangements and that making this modification is simple.

As a different type of such vehicles for children, there is one having a manual push handle attached to the rear of the vehicle body. This handle is used, for example, when a grown-up pushes the vehicle with a child placed therein to amuse the child or when a child pushes the vehicle. As considered from such manner of use of the vehicle employing the handle, the steerable arrangement described above is not desirable from the standpoint of operability and for this reason the front wheels have been made to be unsteerable. If, however, such handle can be easily removed, the vehicle for children may be changed into one having a pleasing external appearance by removing the handle when a manual push operation is not intended.

Such a change into a vehicle for children having a pleasing external appearance would also be practical and economical. At the same time, however, the vehicle for children has become inoperable by anyone but children. If so, the child would desire a freer maneuverability, namely the ability to steer the front wheels by means of the steering wheel.

SUMMARY OF THE INVENTION

According to the invention, two manners of use, one in which the handle is pushed with the front wheels rendered unsteerable and the other in which the front wheels are rendered steerable by a child with the handle removed, are achieved in a single vehicle for children.

The invention is directed to a vehicle for children including a vehicle body, front wheels, rear wheels, a steering shaft steerably supporting said front wheels, a steering wheel attached to the upper end of said steering shaft, and a manual push handle attached to a relatively rearward portion of said vehicle body, characterized in that said steering shaft is rotatably received in a sleeve disposed in a relatively forward portion of the vehicle body so that said front wheels can be suitably steered by manipulating said steering wheel, said steering shaft being adapted to be selectively released or fixed with respect to said sleeve so as to make the vehicle steerable or non-steerable. The handle is removably attached to the vehicle body. The combination of the arrangement for selectively fixing the steering shaft against rotation and the arrangement for removably attaching the handle enables the two manners of use, one in which the handle is pushed with the front wheels rendered unsteerable and the other in which the front wheels are rendered steerable by a child with the handle removed, to be achieved in a single vehicle for children.

In a preferred embodiment of the invention, a pin is used as the member for selectively fixing the steering shaft against rotation. Preferably, such pin is a tapered pin. A tapered pin can be fixed in position by being driven in from one side and can be extracted by being driven out from the other side. Therefore, the operation for allowing or preventing the rotation of the steering shaft is very simple.

In another preferred embodiment of the invention, the handle includes vertically extending bars or bar-like bodies while the vehicle body is formed with vertically extending holes. Thus, the handle can be attached to the vehicle body by simply inserting the bars into said holes. When it is desired to remove the handle, the bars may be extracted.

In a further embodiment of the invention, the vehicle is provided with a toppling-preventive member having its free end disposed rearwardly of the place of contact between the rear wheels and the ground, with a light clearance between said member and the ground. This toppling-preventive member is preferably removably attached to the vehicle, and in the manner of use of the vehicle employing the handle, it advantageously prevents the vehicle for children from toppling over rearwardly when the vehicle is being pushed.

Accordingly, a principal object of the invention is to provide a vehicle for children having front wheels which are selectively steerable or non-steerable.

Another object of the invention is to provide a vehicle for children, wherein in addition to said selective steerable arrangement, the handle is adapted to be removable, whereby various manners of use of the vehicle can be selectively adopted.

Still a further object of the invention is to enable two manners of use, one in which the handle is pushed with the front wheels rendered unsteerable and the other in which the front wheels are rendered steerable by a child with the handle removed, to be achieved in a single vehicle for children.

In another aspect of the invention, it provides a construction by which the selection of the manners of use described above can be made by a simple operation.

In another aspect of the invention, it provides a vehicle for children which is rather safe in its use since it has an arrangement for preventing the vehicle from toppling over rearwardly especially when the vehicle is used while employing the handle.

These and other objects and features of the invention will become more apparent from the following description given with reference to the accompanying drawings.

BRIEF DESCRIPTION OF THE INVENTION

FIG. 5 is a sectional view showing the parts of FIG. 4 put together;

FIG. 6 is a perspective view of another embodiment of the invention corresponding to the parts shown in FIG. 4;

FIG. 7 is a sectional view showing the parts of FIG. 6 put together;

FIG. 8 is a view showing another embodiment of the invention, showing a part of a vehicle for children in section;

FIG. 9 is a perspective view showing the principal portion of FIG. 8 disassembled, ans also showing parts corresponding to FIG. 4;

FIG. 10 is a sectional view showing the assembled parts of FIG. 9;

FIG. 11 is a plan view of a part of a vehicle for children, showing another embodiment of the invention;

FIG. 12 is a sectional view taken along the line II—II of FIG. 11;

FIG. 13 is a perspective view of a part of a steering shaft, showing another embodiment of the invention;

FIG. 14 is a sectional view showing an arrangement associated with the steering shaft shown in FIG. 13;

FIG. 15 is an enlarged perspective view of a toppling-preventive member; and

FIG. 16 is a fragmentary side view showing a part of a vehicle for children having the toppling-preventive member of FIG. 15 attached thereto.

DESCRIPTION OF THE PREFERRED EMBODIMENTS

Figure 1:
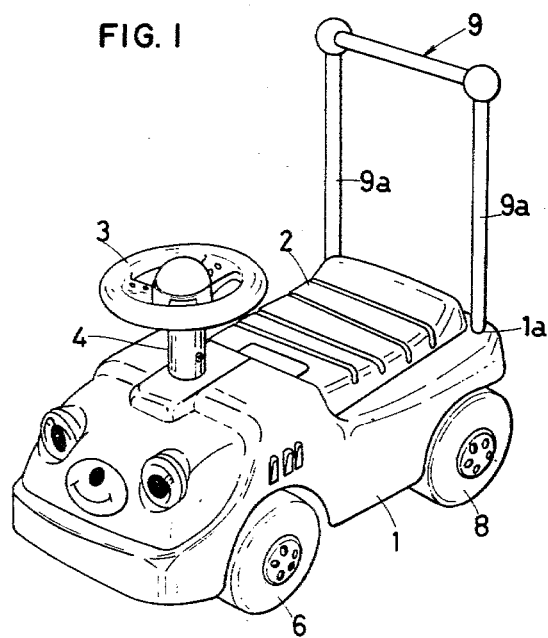
FIG. 1 is an external perspective view of an embodiment of the invention.
Figure 2:
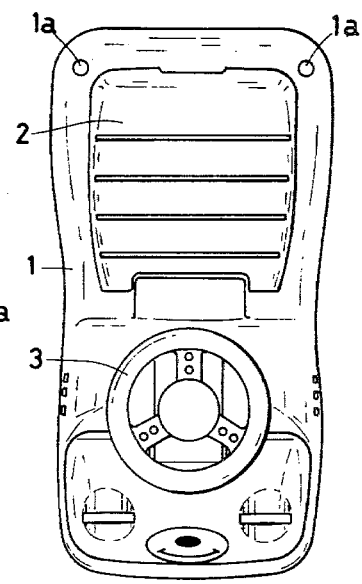
FIG. 2 is a plan view of FIG. 1, with the handle removed.
Figure 3:
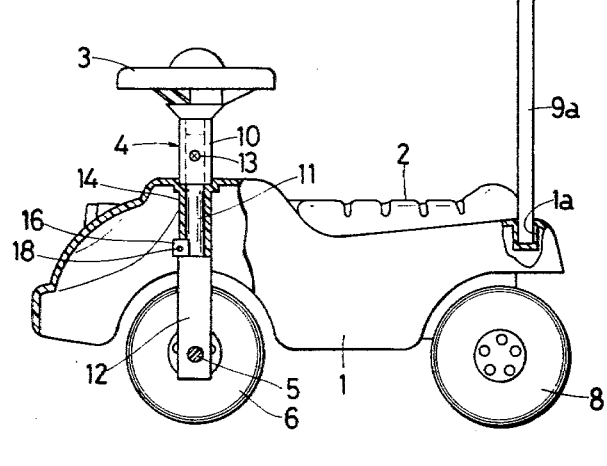
FIG. 3 is a partly broken-away side view of FIG. 1.

Referring to FIGS. 1 through 3, a vehicle for children has a vehicle body 1 made, for example, of rigid plastic. A seat 2 is provided on the upper surface of the vehicle body in a relatively rearward portion thereof. Preferably, the seat 2 is arranged to be capable of being opened and closed so as to store things under the seat 2. A steering wheel 3 is installed at a position enabling a child on the seat 2 to operate the same. The steering wheel 3 is held by a steering shaft 4 with respect to the vehicle body 1. The lower end of the steering shaft 4 supports a front axle 5 rotatably carrying front wheels 6 at its opposite ends. A rear axle 7 (FIG. 16) is provided in the rear of the vehicle body 1 and carries rear wheels 8 at its opposite ends. A handle 9 extends upwardly from the rear end of the vehicle body 1. The handle 9 is provided for pushing the vehicle for children from behind and is arranged so that it can be extracted from the vehicle body 1 when becoming unnecessary. More particularly, the handle has vertically extending bars 9a which are simply inserted in holes 1a formed in the vehicle body.

FIG. 3 shows how the steering shaft 4 is attached. Referring to FIG. 3 and also FIGS. 4 and 5, the steering shaft 4 comprises an upper tube 10, an intermediate shaft 11 and a lower block 12. Thus, the steering wheel 3 is fixed to the upper tube 10, while front wheels 5 are held by the lower block 12. The intermediate shaft 11 has its upper end inserted in the upper tube 10 and is fixed to the upper tube 10 by a screw 13. Prior to such inserting the lower end of the shaft 11 is fixed to the lower block 12. The vehicle body 1 is provided with a sleeve portion 14 for turnably holding the steering shaft 4. In practice, the sleeve portion 14 receives the intermediate shaft 11, and the upper and lower end surfaces of the sleeve portion 14 abut against the lower end surface of the upper tube 10 and the upper end surface of the lower block 12, respectively, whereby slipping-off is prevented. The sleeve portion 14 is provided with a notch 15 for a reason to be presently described. The notch 15 of the sleeve portion 14 extends over a predetermined angular range. The intermediate shaft 11 is provided with a projection 16 at a position such that it is received in the notch 15 when the intermediate shaft 11 is inserted into the sleeve portion 14. Since the projection 16 is limited in the range of its movement within the notch 15, the range of turning of the steering shaft 4 is predetermined. This arrangement assures safety and satisfactory operability.

The projection 16 is provided with a throughgoing hole 17 extending in a direction to cross the axis of the steering shaft 4. A pin 18, such as a taper pin, is inserted in said throughgoing hole 17. A taper pin would be easy to fix in position by simply driving it into the throughgoing hole 17. The state of the pin 18 driven in is shown in FIG. 5. In FIG. 5, the pin 18 is also in contact with the two lateral edges of the notch 15. In this state, therefore, the intermediate shaft 11, i.e., the steering shaft 4 is prevented from turning with respect to the sleeve portion 14, i.e., the vehicle body 1.

In this way, the steering wheel 3 and the front wheels 6 are prevented from being steered. If it is desired to steer the vehicle by means of the steering wheel 3, this may be achieved by striking the thinner end of the pin 18 to drive it out of the throughgoing hole 17. As a result, the steering shaft 4 becomes turnable within the predetermined range, so that it becomes possible to steer the front wheels by manipulating the steering wheel 3.

As for the arrangement for selectively fixing the steering shaft 4 against rotation, a number of modifications may be contemplated, as described below.

Figure 4:
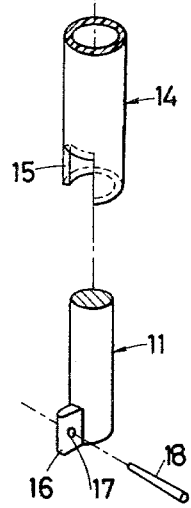
FIG. 4 is an exploded perspective view of some parts shown in FIG. 3.

FIGS. 6 and 7 are views showing another example of the means for fixing the steering shaft against rotation. What is shown in FIGS. 6 and 7 is a minor modification of what is shown in FIGS. 4 and 5 described above. The corresponding parts are given like reference numerals, and only the different portions of the arrangement will be described.

The sleeve portion 14 is provided with throughgoing holes 19 extending through the wall thereof. The intermediate shaft 11 is also provided with a throughgoing hole 20 extending laterally thereof. Here, the projection 16 does not have a throughgoing hole 17 as shown in FIG. 4.

With the arrangement described above, when the intermediate shaft 11 is inserted into the sleeve portion 14, the projection 16 is received in the notch 15 and the throughgoing holes 19 and 20 are aligned with each other. If, therefore, the pin 21 is driven into the aligned throughgoing holes 19 and 20, the intermediate shaft 11, i.e., the steering shaft 4 is fixed to the sleeve portion 14.

FIGS. 8 through 10 are views showing another example of selectively fixing the steering wheel against rotation. In FIGS. 8 through 10, the parts corresponding to those shown in FIGS. 3 through 5 are given like reference numerals, and only the arrangement of the different portions will be described.

The sleeve portion 14 is provided with a second notch 22 as well as a notch 16 for receiving the projection 16. A key-like member 23 is prepared in correlation to the size of the notch 22. The key-like member 23 is attached to the side of the intermediate shaft 11 by means of a screw 24. The attached state is shown in FIG. 10, from which it is seen that the key-like member 23 is intimately received in the second notch 22.

As described above, the intermediate shaft 11, i.e., the steering wheel 4 is fixed to the sleeve portion 14. If the screw 24 is extracted as by a screw-driver, the key-like member 23 is separated, allowing the rotation of the steering shaft 4.

FIGS. 11 and 12 illustrate another example of the means for selectively fixing the steering shaft against rotation. In FIGS. 11 and 12, the parts corresponding to those shown in FIGS. 1 through 5 described above are given like reference numerals, and only the different arrangement will be described.

In the example shown therein, said notch 15 and projection 16 are not provided. Instead, a flange 25 is provided which extends from the upper tube 10. The flange 25 is received in a segmental recess 26 formed on the upper surface of the vehicle body 1. Thus, the combination of the flange 25 and recess 26 limits the range of rotation of the upper tube 10, i.e., the steering shaft 4. The flange 25 is provided with a throughgoing hole extending through the vehicle body 1 and a pin 27 is driven into said throughgoing hole, whereby the rotation of the steering shaft 4 is prevented.

FIGS. 13 and 14 illustrate another example of the means for selectively fixing the steering shaft against rotation. Suffice it to say that the example shown therein is a modification of the example shown in FIGS. 6 and 7. Thus, the parts corresponding to those shown in FIGS. 6 and 7 are given like reference numerals, and only the different arrangement will be described.

In this example, said throughgoing holes 19 and 20 shown in FIGS. 6 and 7 are not provided. Instead, the upper tube 10 is provided with a flange 28. This flange 28 contacts the upper surface of the vehicle body 1. The flange 28 is provided with a throughgoing hole 29, while the vehicle body 1 is provided with a throughgoing hole 30 in alignment with said throughgoing hole 29.

With this arrangement, when a pin 30 is driven into the throughgoing holes 29 and 30, the upper tube 10, i.e., the steering shaft 4 is fixed.

Other examples of means for selectively fixing the steering shaft 4 against rotation may be contemplated.

According to the various embodiments of the invention described above, the two manners of use, one in which the manual push handle 9 is attached while the front wheels 6 are rendered unsteerable and the other in which the handle 9 is removed while the front wheels 6 are rendered steerable, can be achieved in a single vehicle for children. Therefore, the manners of use may be suitably selected as a child grows up, and since this is possible with a single vehicle for children, the invention is very advantageous economically.

In connection with the maners of use described and particularly one in which the handle 9 is used to push the vehicle, it has been found that a situation which is undesirable from the standpoint of safety often occurs. More particularly, the handle 9 is attached to the rear end of the vehicle body 1 and the position of the handle is rather low for grown-ups. Therefore, a grown-up is compelled to bend down when pushing the handle 9, so that it often happens that the force component to propel the vehicle is exceeded by the force component to depress the vehicle. The depressing force component is not desirable from the standpoint of safety in that it often acts to cause a toppling with the front of the vehicle raised by tilting about the rear wheels 8 even if a child is sitting on the vehicle, since children are generally light in weight.

The problem described above can be advantageously solved by attaching a toppling-preventive member 32 of simple construction shown in FIG. 15 in a manner shown in FIG. 16.

Referring to FIGS. 15 and 16, the toppling-preventive member 32 is U-shaped and formed, for example, of a bar. The two open ends of the toppling-preventive member 32 are suitably upwardly bent, thereby determining the direction in which the toppling-preventive member 32, when attached to the vehicle body 1, extends. The open ends 33 are each provided with a flange 34 and an external thread 35 which will receive a nut, e.g., box nut 36.

FIG. 16 shows the toppling-preventive member 32 in its attached position. The method of attachment comprises inserting the open ends 33 of the toppling-preventive member 32 into predetermined attaching holes 37 from below the vehicle body 1. The end of insertion is determined by the flanges 34. Next, the seat 2 is opened to give access to the external threads 35 for screwing the box nuts 36 onto the latter. Upon completion of the screwing operation, the seat 2 is closed. In this way, the toppling-preventive member 32 is attached as shown in FIG. 16. In this state, the free end of the toppling-preventive member 16 is positioned with a slight clearance 39 maintained between it and the ground 38. The free end of the toppling-preventive member 32 opposed to the ground 38 with said clearance maintained therebetween is bent as at 40. The presence of said bend 40 assures the smooth travel of the vehicle for children even if the ground is somewhat irregular or the vehicle moves back.

When the handle 9 becomes unnecessary and hence the danger of toppling of the vehicle no longer exists, the toppling-preventive member 32 can be easily removed. This is achieved by simply unscrewing the box nuts 36 from the external threads 35 and extracting the toppling-preventive member 32.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A toy vehicle for children comprising: a vehicle body, front wheels, rear wheels, a steering shaft steerably supporting said front wheels, a sleeve portion formed on a relatively forward portion of said vehicle body, said sleeve portion turnably receiving said steering shaft, a manual push handle removably attached to a relatively rearward portion of said vehicle body, a member for selectively fixing said steering shaft against rotation relative to said sleeve portion, said sleeve portion having lateral wall means provided with a notch extending over a predetermined angular range, said steering shaft comprising a projection extending laterally into said notch, said projection having a throughgoing hole extending in a direction substantially at a right angle relative to the axis of said steering shaft, said member for selectively fixing said steering shaft being inserted in said throughgoing hole to abut against the two lateral edges of said notch, whereby said steering shaft is fixed against rotation relative to said sleeve portion.

2. The toy vehicle for children as set forth in claim 1, wherein:

said handle includes vertically extending bar-like bodies, said vehicle body is formed with vertically extending holes, and said handle is attached with said bar-like bodies inserted in said holes.

3. The toy vehicle for children as set forth in claim 1, wherein said member for selectively fixing said steering shaft is a pin which extends between the steering shaft and said vehicle body.

4. The toy vehicle for children as set forth in claim 3, wherein said pin is a taper pin.

5. A toy vehicle for children comprising: a vehicle body, front wheels, rear wheels, a steering shaft steerably supporting said front wheels, a sleeve portion formed on a relatively forward portion of said vehicle body, said sleeve portion turnably receiving said steering shaft, a manual push handle removably attached to a relatively rearward portion of said vehicle body, a member for selectively fixing said steering shaft against rotation relative to said sleeve portion, said sleeve portion having lateral wall means provided with a notch extending over a predetermined angular range, and wherein said member for selectively fixing said steering shaft is a key-like member intimately received in said notch, and means securing said key-like member to said steering shaft.

6. The toy vehicle for children as set forth in claim 5, further comprising a toppling-preventive member whose free end is positioned rearwardly of the place of contact between the rear wheels and the ground with a slight clearance maintained between it and the ground.

7. The toy vehicle for children as set forth in claim 6, wherein said toppling-preventive member is removably attached to said vehicle body.

8. The toy vehicle for children as set forth in claim 7, wherein said toppling-preventive member is screwed to said vehicle body.

9. The toy vehicle for children as set forth in claim 6, wehrein said toppling-preventive member is U-shaped and is attached at the two open ends of the U-shape to said vehicle body to extend relatively downwardly.

* * * * *